(12) United States Patent
Goodhue et al.

(10) Patent No.: US 7,562,800 B2
(45) Date of Patent: Jul. 21, 2009

(54) SCREW GUN

(75) Inventors: William V. Goodhue, North Kingstown, RI (US); David E. Daw, Briarcliff, TX (US); David L. Mathieu, Colchester, CT (US)

(73) Assignee: Davicorp. Inc., Spicewood, TX (US)

( * ) Notice: Subject to any disclaimer, the term of this patent is extended or adjusted under 35 U.S.C. 154(b) by 293 days.

(21) Appl. No.: 11/267,211

(22) Filed: Nov. 7, 2005

(65) Prior Publication Data

US 2006/0048366 A1 Mar. 9, 2006

Related U.S. Application Data

(62) Division of application No. 10/925,005, filed on Aug. 25, 2004, now Pat. No. 6,988,303, which is a division of application No. 09/877,036, filed on Jun. 11, 2001, now Pat. No. 6,813,977.

(51) Int. Cl.
*B27F 7/00* (2006.01)
*B65D 85/24* (2006.01)

(52) U.S. Cl. .................. 227/137; 206/338; 227/139

(58) Field of Classification Search ......... 206/338–347; 227/135–139, 107, 117, 118, 120; 81/57.37, 81/454, 457
See application file for complete search history.

(56) References Cited

U.S. PATENT DOCUMENTS

| | | | | |
|---|---|---|---|---|
| 2,219,484 A | * | 10/1940 | Lyon | 227/137 |
| 3,670,942 A | * | 6/1972 | Pomeroy | 227/136 |
| 4,653,356 A | * | 3/1987 | Golden | 81/57.14 |
| 4,718,551 A | * | 1/1988 | Whitledge | 206/347 |
| 4,926,719 A | * | 5/1990 | Kross et al. | 81/57.37 |
| 4,936,169 A | * | 6/1990 | Parsons | 81/57.37 |
| 5,445,641 A | * | 8/1995 | Frigg et al. | 606/86 |
| 2002/0170840 A1 | * | 11/2002 | Happonen et al. | 206/338 |

* cited by examiner

*Primary Examiner*—Luan K Bui
(74) *Attorney, Agent, or Firm*—Breiner & Breiner, LLC

(57) ABSTRACT

The invention relates to a screw gun including a driving unit fitted with a slidable cartridge holder adapted for receiving and indexing a separate cartridge containing a plurality of screws. The invention further relates to the replaceable cartridge containing the plurality of screws for use in a screw gun. The invention allows for the loading and insertion of a plurality of screws from a cartridge without requiring a worker to handle and insert the individual screws into the driver.

3 Claims, 4 Drawing Sheets

SCREW GUN

This is a division of Ser. No. 10/925,005, filed Aug. 25, 2004, now U.S. Pat. No. 6,988,303 B2, which is a division of Ser. No. 09/877,036, filed Jun. 11, 2001, now U.S. Pat. No. 6,813,977 B2.

FIELD OF INVENTION

This invention relates to a screw gun. More specifically, the invention relates to a screw gun including a driving unit fitted with a slidable cartridge holder adapted for receiving and indexing a separate cartridge containing a plurality of screws. The invention further relates to the replaceable cartridge containing the plurality of screws for use in a screw gun. The invention allows for the loading and insertion of a plurality of screws from a cartridge without requiring a worker to handle and insert the individual screws into the driver.

BACKGROUND OF THE INVENTION

This invention relates to a screw gun and method for loading and inserting screws. There is a need in industry for a screw gun which can load and insert a plurality of screws without a worker having to individually handle each screw. The screw gun should be compact, lightweight and easy to use in the field. Specifically, for example, in the heating, ventilating and air conditioning ("HVAC") industry, hex-head self-tapping screws with integral washers, sometimes known as "tech screws", are used for connecting adjacent sections of sheet metal duct. A majority of the time, the task of connecting these adjacent sections of sheet metal duct occurs on lifts and in confined spaces. An HVAC worker will insert anywhere from about 2 to 10 screws per duct joint. The present method used by the HVAC worker to insert a tech screw involves the use of a drill with magnetic hex socket in the drill chuck and an apron full of tech screws. The HVAC worker must pick up an individual tech screw from his apron. He then by hand places the screw into the hex socket, and then inserts the screw through the sections of duct. The process is made more difficult when the worker wears gloves, not uncommon in this industry. It is estimated that up to 30% of the screws intended to be inserted into sheet metal duct sections are dropped and lost by the worker as he or she attempts to hand place a screw in the hex socket. Thus, the present method is laborious, slow and costly. Accordingly, there is a need in the HVAC industry, and other similar industries, for a light-weight, portable screw gun that will increase the productivity of workers and decrease costs associated with the time consuming manual insertion of screws in the gun and the cost associated with lost screws.

Screw guns for feeding and locating fasteners for insertion into a workpiece are generally known in the art. However, these designs are not practical as they are overly complex and, therefore, costly, and they are bulky and not easy to use, especially when working in confined spaces. For example, known power operated devices for feeding and locating fasteners, like those disclosed by U.S. Pat. No. 5,031,489 to Young et al. and U.S. Pat. No. 5,015,127 to Hockman, require that a fastener driver be connected to an air supply to power the device and connected to a hopper or the like in order to continuously feed the driver with fasteners. Such devices limit their application because of their lack of mobility and unwieldiness. Accordingly, such devices are not practical for use in confined spaces, such as when working on a scaffolding or a lift. Similar devices for feeding and locating fasteners have strips which carry the screws and are swingedly suspended from the device, such as disclosed in U.S. Pat. No. 3,910,324 to Nasiatka and U.S. Pat. No. 4,581,964 to Takatsuru. These devices are also not practical for use in confined spaces because of the added weight and awkwardness associated with the devices.

U.S. Pat. No. 4,936,169 to Parsons discloses a portable device for positioning and inserting fasteners wherein an applicator is positioned adjacent to a positioning mechanism containing a rotatable cylinder which includes a plurality chambers for housing fasteners. However, the Parsons device also includes a number of drawbacks including that it is bulky, the operator is required to align a screw with the applicator by hand before he can insert a second screw into a workpiece, and the screw is not readily visible prior to insertion.

The present invention solves the problems of the prior art devices as discussed hereafter.

PRIMARY OBJECTS AND BRIEF DESCRIPTION OF THE INVENTION

It is a primary object of the invention to provide a screw gun capable of carrying a number of screws in an easily loadable and removable cartridge, thereby allowing a worker the ability to insert multiple screws in a workpiece without ever having to handle the individual screws.

It is a further primary object of the invention to provide a cartridge for carrying a multiplicity of fasteners, such as screws, which is easily loaded and removed from a screw gun. The fasteners are releasably held in the cartridge until engaged by the driver of the screw gun.

It is a further primary object of the invention to provide a screw gun for inserting fasteners, such as screws, having a novel cartridge holder for locating the fasteners from a cartridge into the driver of the screw gun.

It is a further object of the invention to provide a screw gun having a driver and guide post with a cartridge holder slidably arranged thereon for carrying a rotatable cartridge containing a multiplicity of screws. The screw gun components cooperate with the cartridge for quickly and efficiently locating fasteners, such as screws, on the driver for subsequent insertion into a workpiece.

It is another object of the invention to provide a screw gun having a cartridge holder which will automatically align a cartridge containing a multiplicity of fasteners, such as screws, so that a worker can easily and quickly change the cartridge in the screw gun. The cartridge upon insertion into the gun will automatically be aligned for locating and loading a fastener.

It is another object of the invention to provide a screw gun having a cartridge holder which will automatically index and align a cartridge containing a multiplicity of fasteners, such as screws, by pump action so that a worker can easily and quickly insert a number of fasteners from the cartridge without having to handle the individual fasteners or adjust the cartridge.

It is another object of the invention to provide a screw gun which is simple in construction, easy to manufacture and durable. The screw gun is light-weight, portable and can be used in confined spaces, such as on a lift, to insert tech screws in duct work. The invention provides for an easily loadable and unloadable cartridge holding 8 to 10 screws.

It is another object of the invention to provide a screw gun having a driver that projects sufficiently beyond the cartridge holder such that the screw is plainly visible to the worker for easily locating the position of the screw into the workpiece.

It is a further object of the invention to provide a screw gun having the driver projecting beyond the cartridge holder to allow insertion of screws in tight spaces.

It is another object of the invention to provide a screw gun where the center of the gravity of the gun remains close to a worker's wrist to make the gun easy to hold and well balanced. This provides a screw gun which is easy and comfortable to use for the worker.

The screw gun of the present invention comprises a driving unit; an elongated driver for receiving a fastener such as a screw; a guide post connected to the driving unit and having a cam path; a cartridge holder slidably mounted on the guide post in cooperation with the cam path of the guide post, and a cartridge carrying a multiplicity of fasteners. In this specification, the fasteners will hereafter be referred to as screws with the understanding that other fasteners may be used with the invention.

In operation, the screw cartridge is inserted into the cartridge holder of the gun and it is automatically aligned so that a chamber of the cartridge is in alignment with the driver of the gun. A screw is loaded from the cartridge to the driver by pump action. By pump action, we mean that the cartridge holder is manually moved inward toward the gun to load a screw into the driver and for subsequent insertion into a workpiece. The cartridge holder includes a cam follower which moves in cooperation with the cam path on the guide post. The inward movement of the cartridge holder causes an indexing mechanism in the cartridge holder to be in position, or "cocked", to index the next chamber of the cartridge with the driver when the cartridge holder is thereafter pumped outward after insertion of the screw. Thus, after a screw is inserted, the cartridge holder is moved outward which, at the end of the outward stroke, causes the cocked indexing mechanism to rotate the cartridge such that the next screw is in alignment with the driver. It is understood that the pump action of the screw gun may be replaced by an automated system such as using a spring means connected to the cartridge holder and the driver to allow the cartridge holder to automatically return to the outer end of the driver after insertion of a screw.

The present invention includes a unique cartridge for holding a multiplicity of screws, preferably eight to ten screws. The worker does not have to handle the individual screws and merely inserts the cartridge into the screw gun and removes the cartridge when expended. A cartridge of eight to ten screws can be inserted quickly providing ease of use, saving substantial time to the worker, avoiding the handling of individual screws, and avoiding the loss of screws. The cartridge includes a central opening through which the guide post passes and a multiplicity of chambers for carrying the screws. Extending outwardly between each chamber is a rib which serves to align and index the cartridge in cooperation with a pin and a pawl of an indexing mechanism of the cartridge holder as will be explained below.

Each chamber of the cartridge includes a screw retaining portion and an exit portion through which a screw is eventually moved into readiness for insertion. Flexibly attached near the exit portion of the cartridge chamber are a multiplicity of fingers adapted for retaining the screw. Each finger has a free end and a bound end. The bound end is that part of finger that is flexibly attached near the exit portion of the chamber. The retaining portion fingers include a groove adapted to receive an integral washer of the screw. The groove is interposed between a first tapered portion and a second tapered portion. The first tapered portion is adjacent to the head of the screw while the second tapered portion is positioned just underneath the groove which holds the retained washer.

The design of the chambers of the cartridge is such that when the driver is inserted into the retaining portion of the chamber during the pump action of the cartridge holder, the driver rides along the first tapered portion of the fingers exerting outward pressure thereon as the driver moves over the head of the screw. The pressure exerted on the first tapered portion causes the washer to become dislodged from the groove by forcing the second tapered portion outward. When the cartridge holder completes the inward pumping motion, the loaded screw is fully visible to the worker and ready to be inserted into a workpiece.

The cartridge holder of the present invention comprises a housing having a rear cover plate, a front cover plate and a pocket for receiving the screw cartridge. The pocket includes an inner pocket wall behind which is an indexing mechanism for aligning and indexing the screw cartridge. The pocket is adapted to receive the screw cartridge and, in conjunction with the indexing mechanism, to align a chamber of the cartridge with the driver. Thus, a chamber of the cartridge is automatically aligned with the driver by means of an interaction between two ribs of the cartridge and a pin and a pawl assembly of the indexing mechanism which extend through the inner pocket wall into the pocket of the cartridge holder. The pin and pawl are aligned essentially on a diameter of the cartridge. More specifically, the pin and pawl are offset from the center line of the cartridge by half of the thickness of the ribs of the cartridge so that the ribs lay over the center line in such a way as to align a chamber of the cartridge with the driver.

The indexing mechanism of the cartridge holder is of simple construction so as to include minimal moving parts and to be durable. It functions to align the cartridge when it is inserted into the cartridge holder and to index the cartridge. The indexing mechanism comprises a sleeve through which the guide post extends. A cam follower extends into the sleeve and cooperates with the cam path of the guide post. Extending from the sleeve are an oscillating plate and a cam plate. The oscillating plate includes a housing carrying the pawl which pawl extends through the inner pocket wall and into the pocket. The opening in the inner pocket wall through which the pawl extends is in an arcuate shape. The oscillating plate further includes a post to which a spring is connected. The opposite end of the spring is connected to a second post attached to the underside of the inner pocket wall. The cam plate is sloped and cooperates with a cam follower at one end of the pin.

The indexing mechanism is caused to rotate when the cartridge holder is pumped inwardly toward the driving unit as the cam follower of the indexing mechanism rides along the cam path of the guide post. During this rotation, the oscillating plate is rotated and causes the pawl to move through the arcuate opening in the inner pocket wall and provides tension to the spring. A sloped portion of the head of the pawl passes under the next rib of the cartridge holder. After passing under the rib, the non-sloped side of the pawl head engages the rib and the tension from the spring holds it against the rib. At this point, the cartridge is not free to rotate because the driver has passed through a chamber of the cartridge. Concurrently, the cam plate is rotated along the cam follower portion of the pin causing the pin to move inwardly and out of the pocket of the cartridge holder. This motion of the indexing mechanism serves to cock the cartridge holder for subsequent indexing of the screw cartridge when the cartridge holder is moved outward. Thus, the pin has been moved out of the pocket allowing for the ribs of the screw cartridge freedom to rotate. When the cartridge holder is moved outward the pawl moves back to its original position during which movement its engagement with the rib of the cartridge thereby moves the cartridge to index the next screw chamber in alignment with the driver. At the end of this movement, the pin is moved back into the pocket by means of the cam plate and cam follower of the pin. The pin again now serves to engage a rib of the cartridge, thereby stopping the rotation of the cartridge and automatically aligning a chamber of the cartridge with the driver for subsequent loading of the next screw from the cartridge.

The cam path of the guide post includes a gradual spiral at a side wall against which the cam follower of the indexing mechanism rides during the inward pumping action of the cartridge holder. Generally, the movement of the cam follower against the side wall by way of the pump action of the cartridge holder is translated through the indexing mechanism located within the cartridge holder into rotatably indexing the cartridge as generally described above and specifically described below.

BRIEF DESCRIPTION OF THE DRAWINGS

Other objects, advantages, and novel features of the present invention will become apparent from the following detailed description of the invention when considered in conjunction with the accompanying drawings, in which like reference numerals designate like parts throughout the figures thereof, and wherein.

DETAILED DESCRIPTION OF THE PRESENTLY PREFERRED EMBODIMENTS

Figures 1, 2, 2A:
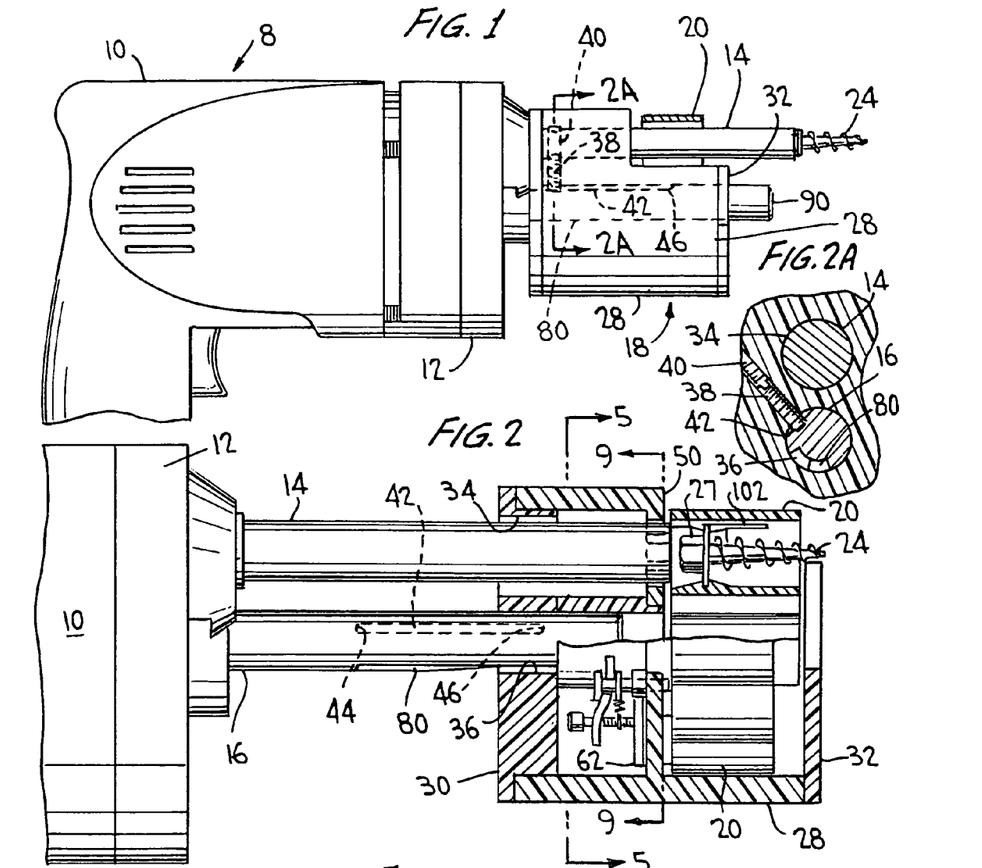
FIG. 1 is a side elevational view of a screw gun in accordance with a preferred embodiment of the present invention.
FIG. 2 is a side partial sectional view of the screw gun of the present invention in the unloaded position.
FIG. 2A is a vertical cross-sectional view at line 2A-2A of FIG. 1.
Figure 3:
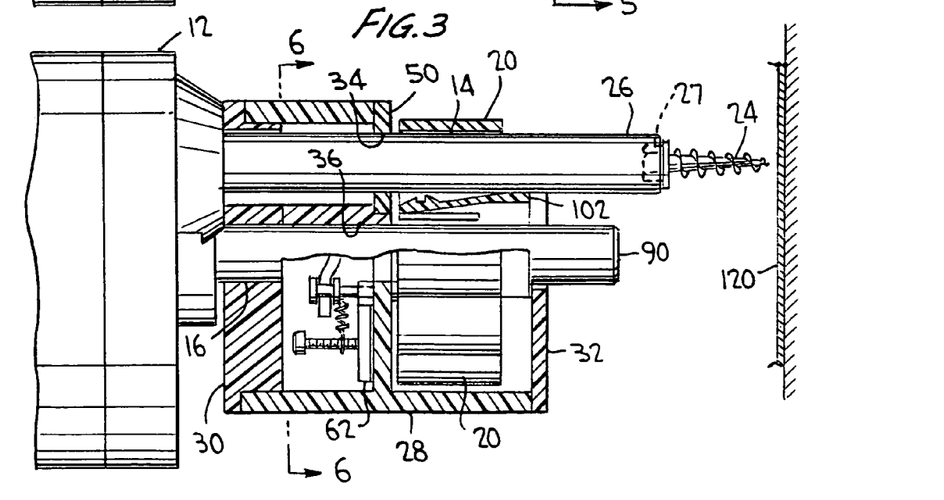
FIG. 3 is a side partial sectional view of the screw gun of the present invention with a screw loaded in the driver and ready for inserting the screw into a workpiece.
Figure 4:
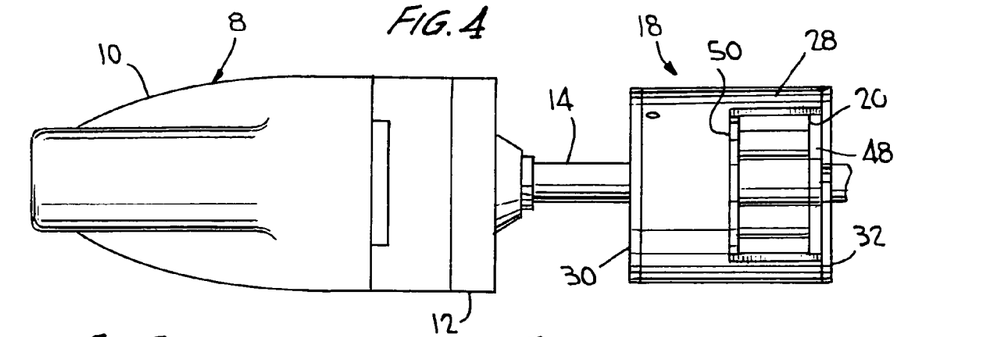
FIG. 4 is a top plan view of a preferred embodiment of the screw gun of the present invention.

An improved screw gun and parts thereof for inserting fasteners such as screws is shown in FIGS. 1 through 16. The screw gun 8 generally comprises a driving unit 10 having a cover plate 12, a driver 14, a guide post 16, a cartridge holder 18 and a cartridge 20. The cartridge holder 18 is slidably affixed to guide post 16 and adapted to align and index the cartridge 20 which contains a plurality of chambers 22 for retaining screws 24. The screws 24 are loaded on the driver 14 by means of a pump action of cartridge holder 18 along a cam path 80 on guide post 16. Thus, FIG. 2 shows the screw gun in the unloaded position. When the cartridge holder 18 shown in FIG. 2 is pumped along the cam path 80 of guide post 16, the screw gun is loaded with a screw as shown in FIG. 3. As will be explained in greater detail hereafter, when the cartridge holder is pumped, a screw is loaded onto the driver 14 and the indexing mechanism shown in FIGS. 5-8 is cocked to index the cartridge 20 when the cartridge holder 18 is moved outward from the position in FIG. 3 to the position in FIG. 2 in preparation for loading the next screw.

Driving unit 10 is a conventional driving device used in known screw guns and drills such as a Black & Decker drill or a Makita drill. Driver 14 is also similar to drivers used in conventional screw guns, except that it is slightly longer in the preferred embodiment to facilitate acceptance of the cartridge holder 18 and to provide visibility beyond the cartridge holder. Driver 14 includes a driver socket 26 at its end for receipt of a fastener 24, in this instance a hex head screw, although other fasteners may also be used with the invention. In a preferred embodiment, driver socket 26 is magnetic and includes an indented portion 27 which mates with the hex head of screw 24. It is understood that indent 27 of driver socket 26 may be any shape or depth to allow for the receipt of numerous different screw shapes. In the alternative, different shaped detachable driver sockets may be used to accommodate different shaped fastener heads.

Cover plate 12 covers the operating portion of the driving unit 10 and includes an opening for driver 14. It is made of any suitable material, such as plastic or metal, and is held in place by any suitable fastening means such as screws.

Guide post 16 extends outwardly from cover plate 12 and is attached to cover plate 12 by any suitable fastening means such as screws. In the alternative, guide post 16 may be part of cover plate 12. Guide post 16 includes a path 42, e.g. FIG. 2, for maintaining cartridge holder 18 on the guide post 16 as discussed in greater detail below. Guide post 16 further includes a cam path 80, e.g. FIG. 11, which cooperates with a cam follower 76 in cartridge holder 18 in the indexing and alignment of cartridge 20 as will also be explained in greater detail below. In the preferred embodiment, the guide post 16 is located in approximately the center of driving unit 10.

However, this is not limiting to the invention as it is understood that the guide post 16, or multiple guide posts, may be positioned at different locations on driving unit 10.

Additionally, when the screw gun is in the loaded position, e.g. FIG. 3, the guide post is shown extending beyond the front part of the cartridge holder. In another embodiment, the guide post is made of a length such that it is flush with the cartridge holder when the screw is in the loaded position as discussed below.

Cartridge holder 18, as shown for example in FIGS. 1 through 4, includes a housing 28 having a rear cover plate 30 and a front cover plate 32. The cartridge holder is made of any suitable lightweight and durable material, preferably plastic. Rear cover plate 30 includes a driver passage 34 and a guide post passage 36 through which driver 14 and guide post 16, respectively, pass through. The cartridge holder 18 includes a pocket 48 for receiving the screw cartridge 20. The front and rear cover plates are attached to the housing by screws or any other suitable fastening means. In the alternative, the front cover plate 32 may be integral with the housing 28.

Pocket 48 includes an inner pocket wall 50 having passages 34 and 36 for driver 14 and guide post 16, respectively. An indexing mechanism 51 is constructed and arranged in the space between inner pocket wall 50 and rear cover plate 30 as discussed in greater detail below. Inner pocket wall 50 further includes an arcuate opening 60 through which pawl 56 extends and moves and an opening 59 through which a pin 58 extends, as also discussed in greater detail below. Suitable sealing means may be provided at these openings in wall 50 to avoid contamination of the space between wall 50 and plate 30.

To prevent over-extension of cartridge holder 18 on guide post 16 or disengagement of cartridge holder 18 from the screw gun, a slide screw 38, as shown in FIG. 2A, is inserted into a slide screw passage 40 in cartridge holder 18. Slide screw 38 is adapted to ride within the path 42 (FIG. 2) in guide post 16 and having stop means 44 and 46. Path 42 thereby limits the distance of movement of cartridge holder 18 on guide post 16. In the alternative, cartridge holder 18 may be retained on guide post 16 by a cap on the end of the guide post. This will eliminate the need for slide screw 38 and path 40 and path 42.

Figure 9A:
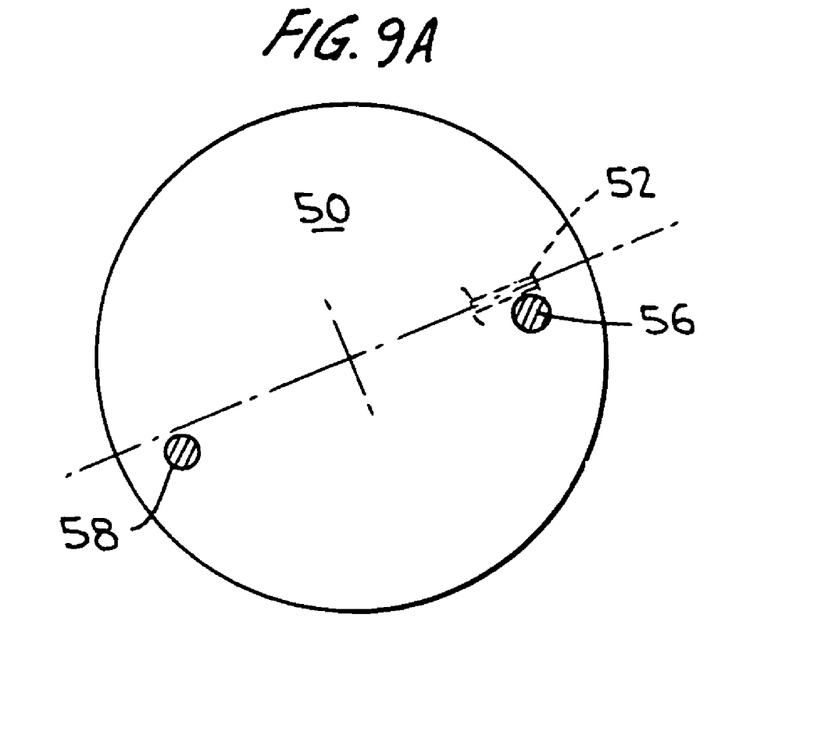
FIG. 9A is a schematic showing the location of the pin and pawl in relation to the center line of the cartridge for aligning the cartridge.

As referred to above, cartridge holder 18 includes a pocket 48 for receiving cartridge 20. When cartridge 20 is inserted into pocket 48, it is automatically aligned so that a chamber 22 is aligned in front of driver passage 34. More particularly, cartridge 20 includes an opening 54 though which guide post 16 passes and ribs 52 between chambers 22 and extending outwardly therefrom at the front of the cartridge, e.g. FIG. 14A. As shown for example at FIG. 9, alignment of a chamber 22 with driver passage 34 is achieved by means of an interaction between a rib 52 with pawl 56 of cartridge holder 18 and pin 58 with another rib 52. Pawl 56 and pin 58 extend through inner pocket wall 50 into pocket 48 and are positioned approximately diametrically opposed to each other and offset by the radius of the pin and half the thickness of the rib as shown by way of illustration in the schematic of FIG. 9A. Thus, when a cartridge 20 is inserted into cartridge holder 18, cartridge 20 will always come to rest within pocket 48 with a chamber 22 in alignment with driver passage 34. This is important as anytime a worker inserts a new cartridge 20 into the screw gun, a screw is automatically aligned with the driver 14 and there is no need for further manipulation by the worker, saving time and making the gun simpler and easier to use.

The mechanism for indexing the cartridge 20 within cartridge holder 18 and aligning the screws of the cartridge with the driver 14 will now be explained in greater detail. In the space between rear cover plate 30 and inner pocket wall 50 is indexing mechanism 51. The indexing mechanism 51 includes a sleeve 53 through which guide post 16 passes. Connected to the sleeve 53 is an oscillator plate 62. Oscillator plate 62 includes a pawl assembly 63. Pawl assembly 63 includes a housing 65 which has a compression spring (not shown) contained therein. The compression spring is held in place by a retaining pin (not shown) which passes through housing 65. The compression spring permits the pawl 56 to be depressed when loading a screw when oscillator plate 62 is rotated. The head of pawl 56 is sloped to allow it to easily pass under by compression an adjacent rib 52a when oscillating plate 62 is rotated from the unloaded to the loaded position. After pawl 56 passes under the rib 52a, the compression spring moves the pawl back into the pocket and the unsloped side of the pawl head engages the rib 52a. When oscillator 62 plate is reversed in rotation the opposite side of the pawl head will move the rib 52a to index the cartridge as discussed in further detail below.

Oscillating plate 62 further includes a post 70 connected thereto and receives spring 68. Spring 68 is connected at its other end to a second post 72 which is connected to the underside of inner pocket wall 50.

Pawl 56 extends resiliently outwardly into pocket 48 through the arcuately shaped slot 60 in inner pocket wall 50. Slot 60 includes at one end a stop 66 and at the other end an end wall 64. Stop 66 is located where it is diametrically opposite to pin 58 to stop pawl 56, to thereby properly position the pawl to allow for automatic alignment of cartridge 20. The pawl 56 will not normally engage end wall 64 when oscillator plate 62 is rotated.

Sleeve 53 further includes a sloped cam plate 78 which cooperates with a cam follower 74 at the end of pin 58 to provide the in and out motion of pin 58 through inner pocket wall 50. Thus, when indexing mechanism 51 is rotated from the unloaded position (FIG. 7) to the loaded position (FIG. 8), the pin 58 will move inward by means of the movement of cam plate 78 along cam follower 74.

Sleeve 51 further includes a cam follower 76 which is on the inside of sleeve 53. Cam follower 76 may be a screw which extends through sleeve 53 and is held in place by a nut 77 at its opposite end. As described in further detail below, cam follower 76 moves along cam path 80 of guide post 16.

Figures 10, 11, 12, 13, 14, 14A, 15, 16:
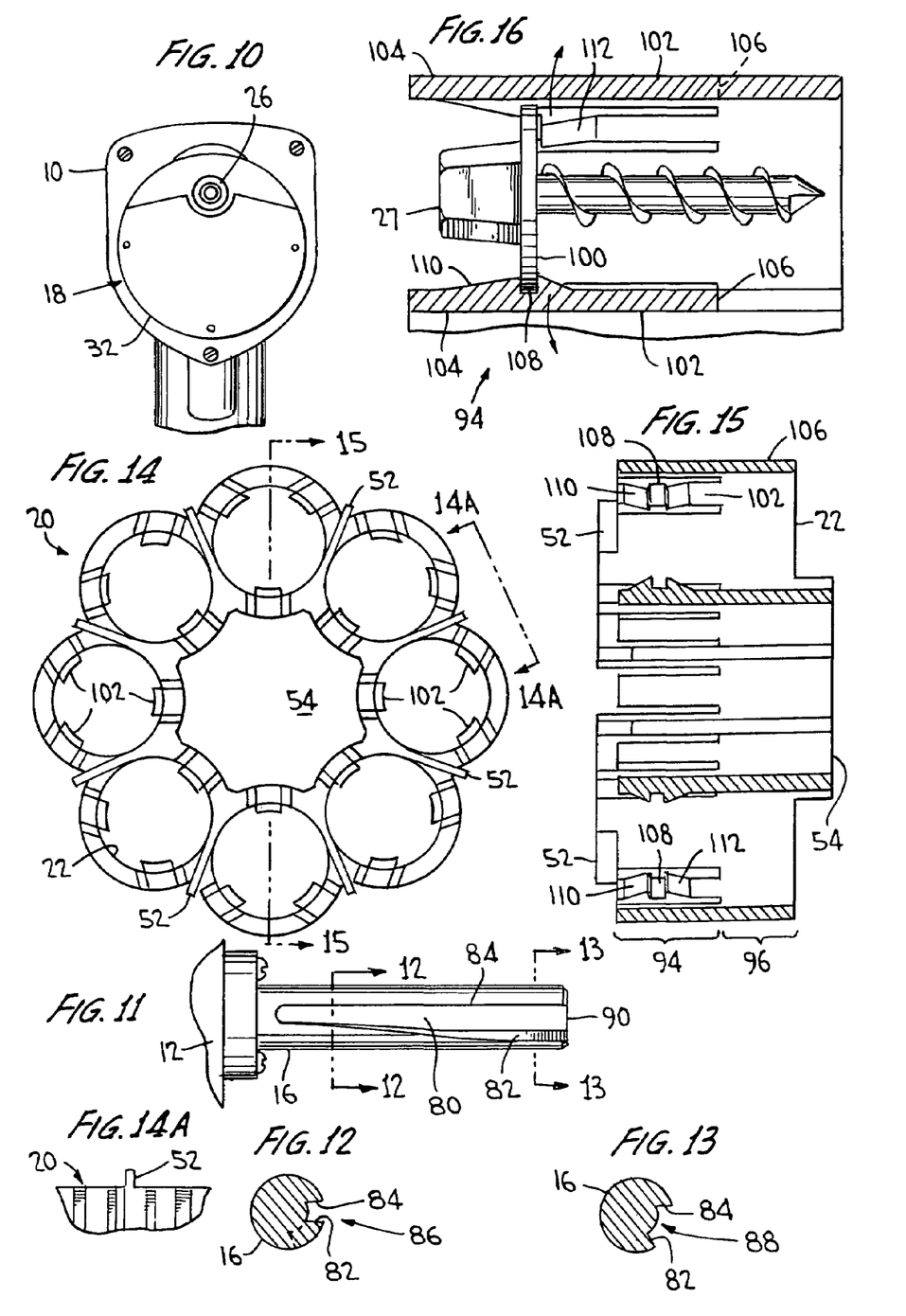
FIG. 10 is a front elevational view of the screw gun of the present invention.
FIG. 11 is a bottom view of the guide post showing the cam path.
FIG. 12 is a cross-sectional view at line 12-12 of FIG. 11.
FIG. 13 is a cross-sectional view at line 13-13 of FIG. 11.
FIG. 14 is a front elevational view of the screw cartridge of the present invention.
FIG. 14A is a view at line 14A-14A of FIG. 14 showing a rib of the screw cartridge.
FIG. 15 is a cross-section of the screw cartridge at line 15-15 of FIG. 14.
FIG. 16 is a sectional view of a chamber of the screw cartridge.

Referring now to FIGS. 11 through 13, cam path 80 includes a gradual spiral 88 along side wall 82 of the path against which cam follower 76 rides when cartridge holder 18 is pumped inwardly and which provides tension to the spring 68 as pawl 56 picks up the next rib 52a. Spring 68 assures that cam follower 76 is kept in contact with side wall 82 throughout the inward pumping motion of cartridge holder 18. When the cartridge holder 18 is moved outwardly, the cam follower 76 is retained along wall 84 of cam path 80 by virtue of pawl 56 being trapped behind the next adjacent rib 52a of the cartridge until the end of cam path 80 is reached where the cartridge is free to rotate and the cam follower moves over to wall 82.

Figure 5:
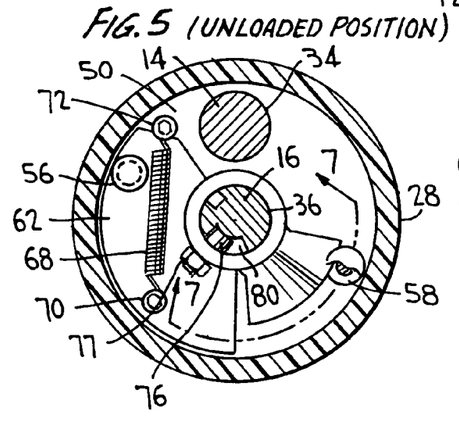
FIG. 5 is a cross-sectional view of the cartridge holder at line 5-5 of FIG. 2 when the gun is in the unloaded position.
Figure 6:
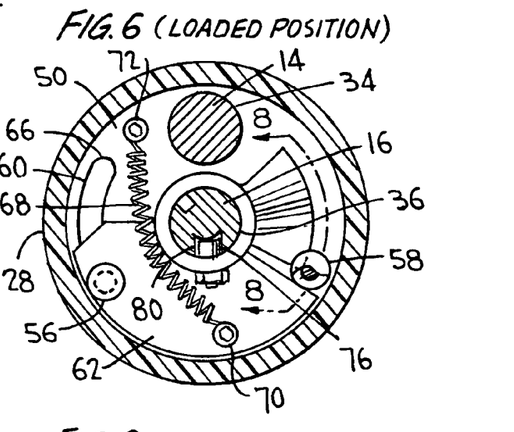
FIG. 6 is a cross-sectional view of the cartridge holder at line 6-6 of FIG. 3 when the gun is in the loaded position.
Figure 6A:
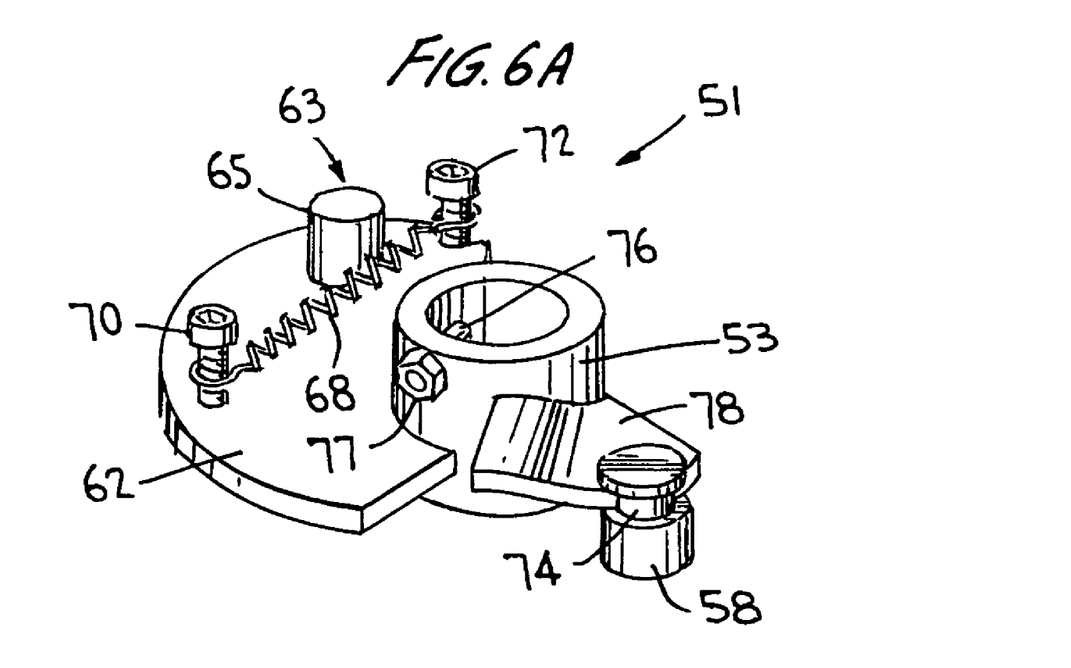
FIG. 6A is a perspective view of the indexing mechanism.
Figures 7, 7A, 8, 9:
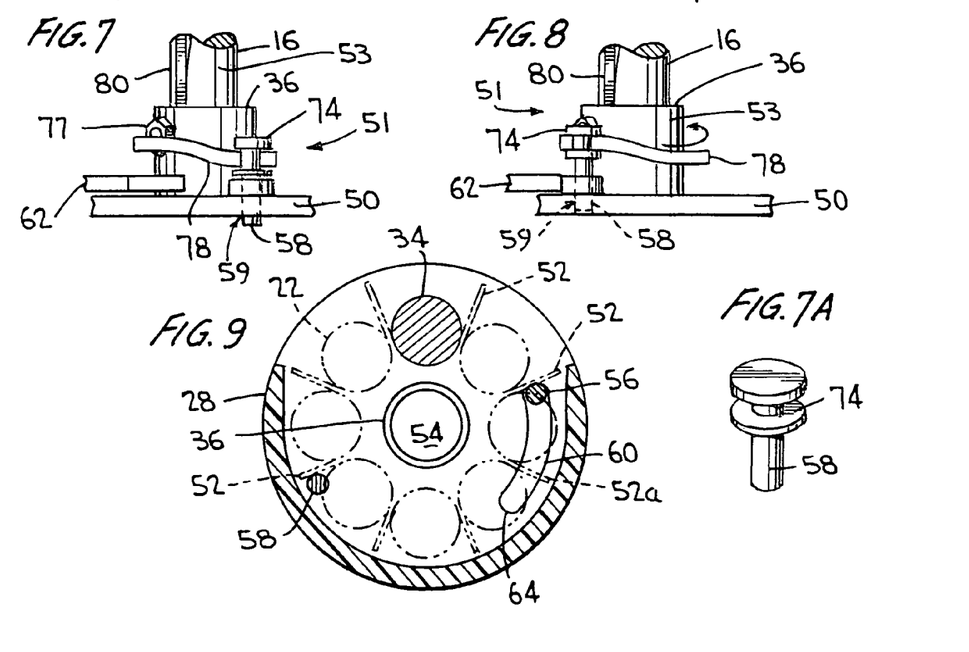
FIG. 7 is a view along line 7-7 in FIG. 5 of the indexing mechanism of the cartridge holder in the unloaded position.
FIG. 7A is a perspective view of the pin and cam follower of the pin.
FIG. 8 is a view along line 8-8 in FIG. 6 of the indexing mechanism of the cartridge holder in the loaded position.
FIG. 9 is a cross-sectional view of the cartridge holder and cartridge at line 9-9 of FIG. 2.

More particularly, as shown for example at FIGS. 2, 5 and 7, when the screw gun is in the unloaded position, cam follower 76 is positioned at an outer end 90 of guide post 16 such that cam follower 76 is located at spiral portion 88 of cam path 80. In this position, pawl 56 is at stop 66 of path 60. As cartridge holder 18 is pumped inwardly, driver 14 moves through pocket 48 of housing 28 and enters a chamber 22 of cartridge 20 whereby a screw 24 is loaded in driver socket 26. Simultaneously, cam follower 76 rides up side wall 82 of cam path 80 of guide post 16 towards parallel portion 86 at the end of the cam path. The movement of cam follower 76 against side wall 82 by way of the inward pumping of cartridge holder 18 is translated through the indexing mechanism 51 which will be in the loaded position as shown in FIGS. 3, 6 and 8 and ready to index cartridge 20 when the cartridge holder 18 is moved outwardly.

Further, as cam follower 76 moves along wall 82 of guide post 16, cam plate 78 is partially rotated around guide post 16 and thereby also moving oscillator plate 62 in the same direction as cam follower 76. Consequently, pawl 56 is rotated along with oscillating plate 62 and positioned behind the adjacent rib 52a, and pin 58 is pulled inwardly out of pocket 48. At this point, cartridge holder 18 is cocked, ready to index another chamber 22 into alignment with driver 14 when the cartridge holder 18 is pumped outward.

Now, after driving a screw, cartridge holder 18 is moved back toward end 90 of guide post 16. In turn, cam follower 76 rides along side wall 84 of cam path 80 until slide screw 38 contacts stop 46. Cam follower 76, however, is prevented from riding along side wall 82 because of the interaction of pawl 56 with the rib 52a. The newly positioned indexing pawl 56 now exerts pressure against rib 52a because of the tension produced in spring 68 when oscillating plate 62 is moved away from post 72. However, until driver 14 is completely withdrawn from chamber 22, cartridge 20 cannot rotate around guide post 16 and align the next screw with driver 14. When driver 14 is completely withdrawn from chamber 22, the physical hindrance preventing movement of pawl 56 is removed, and pawl 56 is sprung back to stop 66 thereby indexing cartridge 20 to place a new chamber 22 in alignment with driver 14. The cartridge is prevented from rotating too far as pin 58 is moved back into pocket 48 by means of cam plate 78 to stop the next rib 52.

Referring now to FIGS. 14 through 17, each chamber 22 of cartridge 20 generally includes a screw retaining portion 94, and an exit portion 96 through which a hex-head screw 24 having an integral washer 100 is driven by driver 14. Flexibly attached near to exit portion 96 of chamber 22 is a set of three fingers 102 adapted at one end for retaining screw 24. Each finger 102 has a free end 104 and a bound end 106. Bound end 106 is that part of finger 102 that is flexibly attached near to exit portion 96 of the cartridge. The cartridge 20 is intended to be disposable and is made of plastic, e.g., polyvinyl chloride, although the cartridge may be made of other materials or made to be reusable.

Fingers 102 include a groove 108 adapted to receive washer 100 of screw 24. Groove 108 is interposed between a first tapered portion 110 and a second portion 112. First tapered portion 110 is adjacent to the head of screw 24 while second tapered portion 112 is positioned underneath groove 108 which holds retained washer 100 of screw 24. The second portion 112 serves to aid in holding the screw in the cartridge until the screw is engaged by the driver as discussed below.

When driver 14 is inserted into chamber 22 during the pumping action, the driver socket 26 rides along first tapered portion 110 exerting outward pressure thereon as socket 26 with indent 27 moves over the head of screw 24. The pressure exerted on first tapered portion 110 causes washer 100 to become dislodged from groove 108 by forcing second tapered portion 112 of finger 102 outward. The driver 14 then passes through exit portion 96 and outside of cartridge 20 as shown in FIG. 3. Screw 24 is now located in driver socket 26 and ready to be inserted into workpiece 120. It is noted that the screw 24 is plainly visible to the worker to allow easy positioning of the screw in the workpiece.

Having described the presently preferred embodiment, the screw gun is operated as follows. In operation, cartridge 20 containing screws 24 is inserted into cartridge holder 18 by the worker. Cartridge 20 automatically aligns itself such that a chamber 22 is positioned in front of driver passage 34 and driver 14. Cartridge holder 18 is then pumped inwardly toward cover plate 12. During this pumping action, three operations are taking place. One, the screw is placed in the driver socket 26; two, the screw is released from the fingers 102 in the cartridge, and three, the charging of the indexing spring 68 takes place. Thus, during the initial pumping of the cartridge, the driver socket 26 of driver 14 engages the head of screw 24. Pressure is applied to the fingers 102 of the cartridge 20 and the fingers extend outwardly thereby releasing the screw 24 from the cartridge and the driver 14 continues to pass through and out of the cartridge 20. During the pumping action, the cam follower 76 of indexing mechanism 51 slides along cam path 80 of the guide post 16. This pumping action causes the oscillating plate 62 to rotate. During this rotation, pawl 56 is moved along arcuate path 60, spring 68 being extended during such movement, and the sloped head of pawl 56 is compressed and passes under the next rib 52a and upon doing so the pawl pops back up on the opposite side of rib 52a and the head of pawl 56 engages rib 52a under tension from spring 68. During this motion pin 58 is moved out of pocket 48 by rotation of cam plate 78 along cam follower 74 of pin 58. The device is now charged to index the next screw into position. After driving screw 24 into the workpiece, cartridge holder 18 is manually pumped outwardly thereby withdrawing driver 14 from cartridge 20. Withdrawal of driver 20 allows spring loaded pawl 56, which was cocked during the inward stroke of cartridge holder 18, to advance thereby aligning the next chamber 22 containing a screw 24 with driver passage 34. The cartridge cannot advance beyond the chamber because the rib 52 of the cartridge is stopped at pin 58 which has moved back into the pocket by means of cam plate 78.

While not necessary or limiting to the invention, it has been found that the screw is most easily loaded in the driver 14 if the driver 14 is being slowly rotated by the driving unit. This can be done manually by the worker or the screw gun can include means for automatically rotating the driver at a slow speed. In the latter case, the rotation may be fixed at a slow speed by means of a stop mechanism in the trigger of the driving unit which stop can be overrode by applying additional pressure on the trigger after the screw is loaded. In the alternative, a rheostat switch can be associated with the movement of the cartridge holder such that when the cartridge holder begins its movement away from the driving unit the driver begins rotation at a slow speed.

Additional modifications to the above screw gun are also envisioned. For example, as referred to previously, the guide post 16 can be modified such that it is of shorter length so as to be flush with the cartridge holder when the gun is in the loaded position. In this embodiment, the cam follower 76 of the cartridge holder is moved further out in the sleeve 53 of the indexing mechanism 51. As also referred to above, a cap can be placed at the end of the guide post to stop the movement of the cartridge holder to preclude the need for path 42 and slide screw 38 and path 40. Also, the location of the pin and pawl can be reversed or otherwise modified.

It is also understood that other equivalent means may be used to index and align the cartridge. Thus, the above-described invention provides for cooperation between the cartridge and the cartridge holder in aligning and indexing the cartridge. Other equivalent means other than as above disclosed may be used for this alignment and indexing and the invention is not limited to the presently preferred means defined above. For example, a ratchet system may be used wherein the cartridge serves as a toothed wheel and ratchets on the cartridge holder to align and index the cartridge.

While a preferred embodiment of the screw gun has been described in detail above, various modifications and variations of the invention are possible in light of the above teachings. For example, while the indexing mechanism described above is the presently preferred means of indexing and aligning a screw within the driver, a different indexing mechanism may be used. Similarly, while the invention is discussed in terms of inserting hex-head screws, the invention may be used with other types of fasteners. Further, the screw gun may be completely automated by a separate power source or by imposing the pumping action by virtue of driving a screw with a spring mechanism moving in while driving the screws. It is, therefore, to be understood that within the scope of the appended claims the invention may be practiced otherwise than as above-described.

It is claimed:

1. A cartridge for a screw gun comprising a rotatable housing having a plurality of chambers for releasably holding a fastening means and having means for indexing the cartridge in a cartridge holder;

wherein said means for indexing the cartridge in the cartridge holder comprises an outwardly extending rib between each of said chambers;

wherein said chambers include a plurality of fingers for releasably holding said fastening means;

wherein said fingers have a free end and a bound end, and include a first tapered portion and a second tapered portion constructed and arranged for holding said fastener means; and wherein said fingers further include a groove between said first and second tapered portions.

2. A cartridge in accordance with claim 1 further including a plurality of fasteners in said cartridge.

3. A cartridge in accordance with claim 2 wherein said fasteners are hex-head screws.

* * * * *